April 15, 1952  T. J. LEHANE ET AL  2,593,038
AIR REHEAT CONTROL FOR HEATING SYSTEM
Filed March 17, 1949  2 SHEETS—SHEET 1

INVENTORS.
Timothy J. Lehane
Ira S. Gardner
BY
Harvey M. Gillespie
Atty.

April 15, 1952 — T. J. LEHANE ET AL — 2,593,038
AIR REHEAT CONTROL FOR HEATING SYSTEM
Filed March 17, 1949

INVENTORS.
Timothy J. Lehane
Ira S. Gardner
BY
Harvey M. Gillespie
Atty.

Patented Apr. 15, 1952

2,593,038

UNITED STATES PATENT OFFICE 2,593,038

AIR REHEAT CONTROL FOR HEATING SYSTEM

Timothy J. Lehane, North Riverside, and Ira S. Gardner, New Lennox, Ill., assignors to Vapor Heating Corporation, Chicago, Ill., a corporation of Delaware Application March 17, 1949, Serial No. 81,974

4 Claims. (Cl. 257—3)

1

This invention relates to an automatic system for controlling the operations of apparatus for heating and cooling an enclosed space, for example a closed vehicle for the transportation of passengers or any other room or rooms to which it may be adaptable.

A principal object of the invention is to provide an improved control system for a heating and cooling system in which the temperature will be maintained at a substantially uniform temperature and in which the thermostats for controlling the heating and cooling operations may be set to normally function at the same temperature, whereby the operation of the system may go directly from the heating cycle into the cooling cycle and vice-versa without causing repeated changes or undue shifting from one set of controls to another before the temperature has changed appreciably from the point of the initial transition. In other words, when the system shifts from the heating to the cooling cycle at a predetermined temperature, the cooling controls will retain control of the system until a distinct change in temperature has been made to justify a return of the system to the heating cycle. Also when the control of the system is transferred from the cooling cycle to the heating cycle, the heating controls will retain their control of the system until the temperature rises a predetermined amount before they will again relinquish their control to the cooling controls.

Another object is to provide an improved control system for a heating and cooling system in which the system automatically shifts from heating to cooling at a predetermined temperature and which when said shift occurs, the cooling controls are automatically adjusted to lower temperature settings so as to retain control of the system and in which certain of the heating controls may function to add heat to the previously cooled air and thereby assist the cooling control elements in retaining control of the system.

The invention further resides in the combination, construction and arrangement of parts illustrated in the accompanying drawings, and while there is shown therein a preferred embodiment, it is to be understood that the same is susceptible of modification and change without departing from the spirit of the invention.

Figures 1, 2:
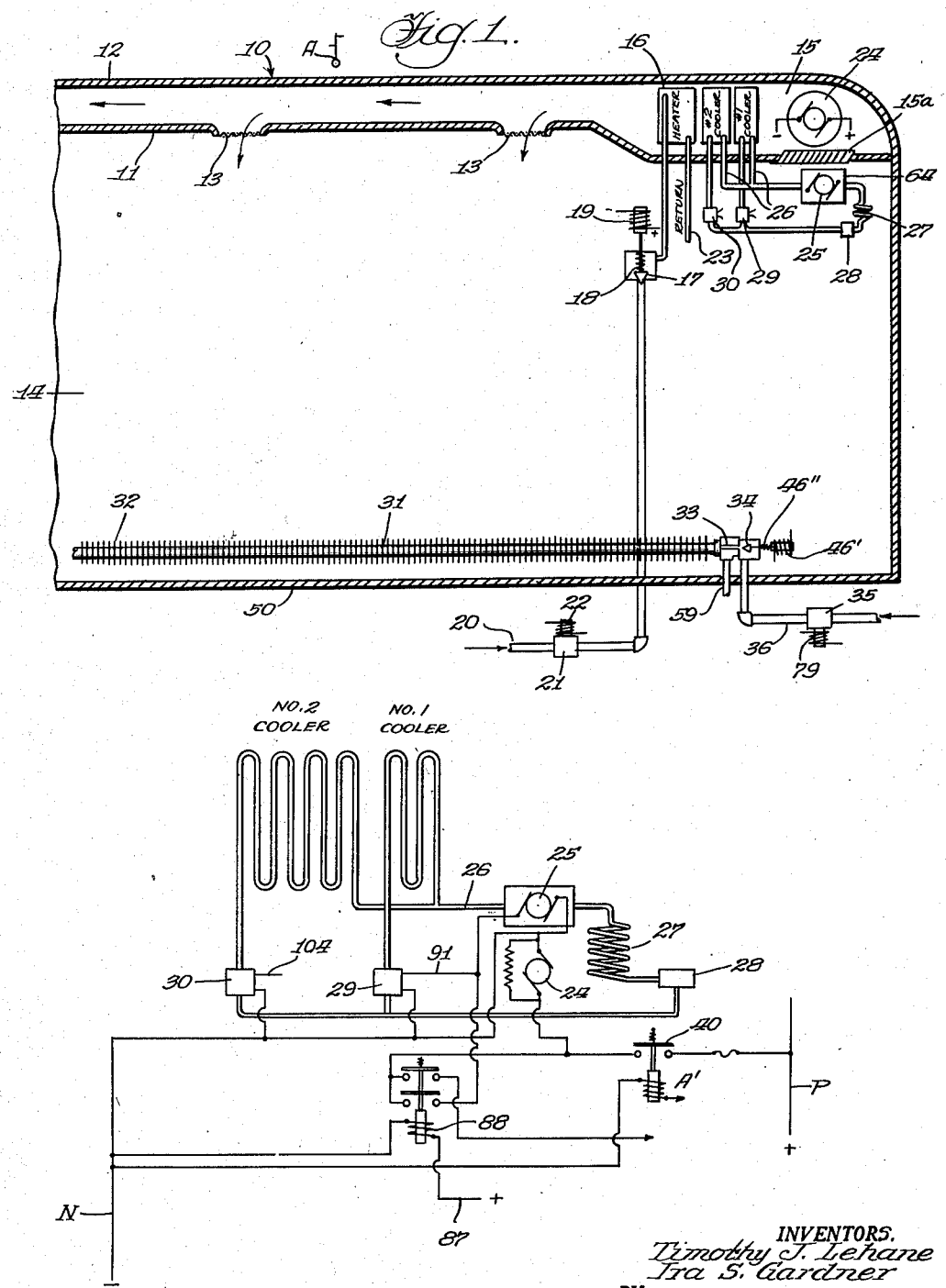
Fig. 1 is a fragmentary vertical section of a railway passenger car embodying the present invention.
Fig. 2 is an enlarged diagrammatic side elevation of a cooling means including a split evaporator and part of the electrical circuits used therewith.

In Fig. 1, a railway car is designated generally by the numeral 10. An air duct 11 extends lengthwise of the car near the roof 12 thereof and is provided with grilled outlet openings 13 at suitable intervals for the delivery of conditioned air into the enclosed space 14 of the car.

The apparatus for conditioning the air is located in an enlarged portion 15 of said air duct and comprises an overhead air heater 16 and an air cooler of the split evaporator type including a No. 1 cooler and a No. 2 cooler. The overhead heater 16 receives heating medium, for example steam, through an inlet valve 17 which is normally closed by a spring 18, but is opened, as hereinafter described, by the energization of a solenoid 19. The supply of steam to the inlet valve leads from a main supply pipe 20 through a main valve 21; the valve being normally open, but is closed by energization of solenoid 22, under the conditions hereinafter described, to lock out all supply of heating medium to the air heater 16. The condensate is discharged from heater 16 through outlet pipe 23.

The No. 1 and No. 2 coolers are arranged in the enlarged end portion 15 of the air duct in advance of an electrically operated blower 24. The blower operates during both the heating and cooling cycles of the system to draw air into the car through the louvers 15ª. This air from the blower is passed, successively, through No. 1 cooler, No. 2 cooler, overhead heater 16, and thence through the grilled discharge openings 13 into the space 14 of the car.

The refrigerant is circulated through air cooler by means of a compressor 25, the suction side of which is connected with return ducts 26 leading from both No. 1 and No. 2 coolers. The refrigerant withdrawn from the coolers is compressed and the heat is liberated therefrom in the condenser element 27. The condensed refrigerant is collected in a collecting chamber 28 and may be reintroduced into the coils of No. 1 cooler through a solenoid valve 29 and into cooler No. 2 through a separably controlled solenoid valve 30.

Floor radiator

In addition to the air heater 16, the heating system includes one or more floor radiators. Each floor radiator includes an outer pipe 31 provided with heat dissipating fins 32 thereon and an inner pipe 33 which receives heating medium, for example steam, through an inlet valve 34. The supply of steam to the radiator inlet valve 34 is controlled by a main valve 35 interposed in a main supply pipe 36. The main valve 35 is normally open, but is closed when the outside temperature reaches a predetermined value, to lock out all steam from the floor radiator valve 34.

The operation of the mechanism above described is controlled by the cooperation of an outside thermostat A and an associated relay A' and four inside thermostats B, C, D and E and their associated relays designated B', C', D' and E'. The outside thermostat A may be set for any temperature desired, but for illustrative purposes is described herein as being set to function, that is to say, to close its contacts when the outside temperature is at or above 50° F. and opens its contacts when said outside temperature is below 50°. Thermostat B is for controlling the admission of heating medium to the floor radiators 31; thermostat C controls the admission of heating medium to the overhead heater 16; thermostat D controls the operation of the No. 1 cooler relay D'; and thermostat E controls the operation of the No. 2 cooler relay E'. The term No. 1 cooler designates cooler 1, and the term No. 2 cooler designates cooler 2, see Figs. 1 and 2.

Relay A' controls the effectiveness of the No. 1 cooler thermostat D and also the effectiveness of the No. 2 cooler thermostat E, these thermostats being connected in series with relay A'. Hence so long as the outside temperature is below 50° relay A' remains deenergized and the current is broken to each of thermostats D and E. When the outside temperature rises to or above 50° the outside thermostat A closes an electric current from the positive line P through wire 37, thermostat A, wire 38, relay A' and wire 39 to the negative line N. This energizes relay A' and closes contact 40 and thereby connects thermostats D and E through wires 42—43 to be energized when the temperature of the car reaches a predetermined value, for example 76° F.

During the heating cycle, both the floor heat and the overhead heat are available, since the floor heat thermostat B and relay B' are connected through normally closed contacts 44 and 45 of the No. 1 cooler relay D' and the No. 2 cooler relay E' respectively, and wires 46, 47, 48 and 49 from the positive line P to the negative line N. When the thermostat B is calling for heat, the thermostat contacts are open and the electric current passes from wire 48, through wires 50 and 51, to energize relay B' and thereby break the normally closed circuit 52, contact 53 and solenoid floor heat valve 34, which latter is solenoid closed and spring opened. This supplies heating medium to the floor heater 31.

The overhead heat of overhead heater 16 is controlled by relay C' under the control of thermostat C. When thermostat C is open at its upper contact, the electric current passes through the solenoid coil of relay C' to close contact 54 and thereby close an energizing circuit through wire 55, contact 54, wire 56 and solenoid 19, overhead heat valve 18, which latter is solenoid opened and spring closed. Both the floor thermostat B and the overhead heat thermostat C are set to function at 76° F. An auxiliary heater 57 for thermostat C is set by variable resistor 23 so as to insure a functional setting of thermostat at a temperature of 76° F. An auxiliary heater 58 of the floor heat thermostat B is connected through the overhead heat relay contact 59 which is normally closed when the overhead heat thermostat C is satisfied. Consequently the floor radiators 31 can be supplied with heating medium only during the functioning of the overhead heater 16. The thermostat C for the overhead heat is also cycled through the lower contact 60 of relay C'. This cycling value is controlled by a 2° cycle resistor 61, relay C' when energized closing contact 60 and closing the electric circuit through wire 62, auxiliary heater 57, wires 63 and 64, contact 60, and wire 65 through cycle resistor 61 to negative line N. This adds 2° to the mercury column in thermostat C when relay C' is energized and removes said 2° when relay C' is deenergized, for cycling purposes as will be understood. Inasmuch as the overhead relay C' is cycled, the corresponding cycling action will be imparted to the thermostat B and, therefore, open and close the floor heat valve 34, providing that the floor heat thermostat B is unsatisfied. It is thus seen that the floor heat and the overhead heat will be automatically and intermittently brought into action until the room temperature reaches a predetermined amount, after which the cycling of relays B' and C' will maintain said temperature substantially constant while the system is in operation. As it is desired that the actual room temperature be held at approximately 70° F., an additional 6° is added to the overhead heat thermostat C by the auxiliary heater 57 through the metered resistance 66 in wire 63; an additional 6° is added to the floor heat thermostat B by the auxiliary heater 58 through the metered resistance 67 in wire 68 and an additional 6° is added to each of the two auxiliary heaters 69 and 70 of cooler thermostats D and E through the metered resistance 71 in wire 72 acting through wires 73 and 74.

*Cooling*

When the outside temperature rises to or above 50° F. the thermostat A functions and the relay A' is energized which closes contact 40 and thereby makes No. 1 cooler thermostat D available to take control of the system when the room temperature plus the auxiliary heat added to said thermostat D causes it to function at 76° F. At that time electric current will pass through it and line 75 to energize the solenoid of No. 1 cooler relay D'. However, the floor heat and the overhead heat are both effective until the said relay D' is energized. At this time, the energization of relay D' opens its contact 44 and thereby deenergizes relay B' so that the solenoid floor heat valve 34 is energized closed to cut off heat to the floor radiators. Energization of relay D' also closes contact 76 to cause electric current to flow through wire 77, contact 76, line 78 and solenoid 79 of main valve 35 for further assuring that flow of heat to the floor radiators will be prevented at the beginning of the cooling operation. However, the overhead heat is still available for use if thermostat C calls for heat, at which time it will function to reheat the previously cooled air and thereby assists the cooling thermostat D to retain control of the system until conditions change which makes cooling unnecessary. Consequently it is possible to reheat the cooled air delivered when the temperature of the car is sufficiently low to cause overhead heat thermostat C to break contact. In order to permit such operation without causing thermostat D to lose control of the system, the functional setting of No. 1 cooler thermostat D is automatically adjusted to a lower temperature setting by adding an additional 2° of heat to its auxiliary heater 69. This heating circuit leads from the positive line P through wire 73, auxiliary heater 69, wire 73ª, contact 80, 2° metering resistor 81 and wire 82 to the negative line N. The closing of the relay D' also closes contact 84 and closes a circuit through line 85, contact 84, and lines 86 and 87, and the compressor relay 88 to start the compressor. Relay D' when energized also closes contact 89 which closes a circuit through line 90, contact 89, line 91 and the solenoid of solenoid-opened valve 29 for cooler No. 1 for admitting refrigerant thereto. The operation of the No. 1 cooler will normally reduce the temperature of the return air and lower the room temperature which will break the contact in the overhead heat thermostat C. This results in energizing relay C' to again close contact 54 to supply a burst of steam to the overhead heater through the solenoid 19 of admission valve 18. The steam to the overhead heater is supplied in a series of bursts since the relay C' will cycle with the thermostat C for a range of 2° which amount corresponds to the value of cycle resistor 61.

The cooler No. 2 thermostat E, as previously indicated, is provided with an auxiliary heater 70 which is automatically set down from 78° to 76° when No. 1 cooler relay D' is energized. Consequently the range difference in the temperature setting between No. 1 cooler thermostat D and No. 2 cooler thermostat E remains at 2°. If the temperature of the car rises to the setdown functional setting of 76° of No. 2 cooler thermostat E, an energizing circuit is closed through the No. 2 cooler relay E' and, therefore, puts the system into full cooling cycle. During this cycle of operation the energizing of relay E' closes contact 92 and closes a circuit through wire 93, contact 94 of No. 1 cooler relay D' (which at this time is closed), wire 95, contact 92 of relay E', and wire 96 through the solenoid 22 of the solenoid-closed and spring-opened overhead main valve 21, to close this valve and definitely lock out all heating medium to the overhead heater 16.

The energizing of relay E' also closes contact 97 which closes a circuit through wire 98, contact 97, and wires 99 and 78, through the solenoid 79 of the solenoid-closed and spring-opened safety lock-out valve 35 to prevent the possibility of any heating medium reaching the floor radiators 31 regardless of whether the floor heat valve 34 had properly closed. The energizing of relay E' further closes contact 100 which closes a circuit through wire 101, contact 100 and wire 87, through the solenoid 88 of the compressor relay to further guarantee the operation of the compressors, this circuit thus acting as a safety circuit to the compressors. Consequently if the No. 1 cooler relay D' for any reason fails to function, the closing of No. 2 cooler relay E' will energize the compressor or compressors of the cooling mechanism. The energizing of relay E' also closes contact 102 which closes a circuit through wire 103, contact 102 and wire 104, through the solenoid of the solenoid-opened and spring-closed valve 44 for controlling the supply of cooling medium to the No. 2 cooler.

Figure 3:
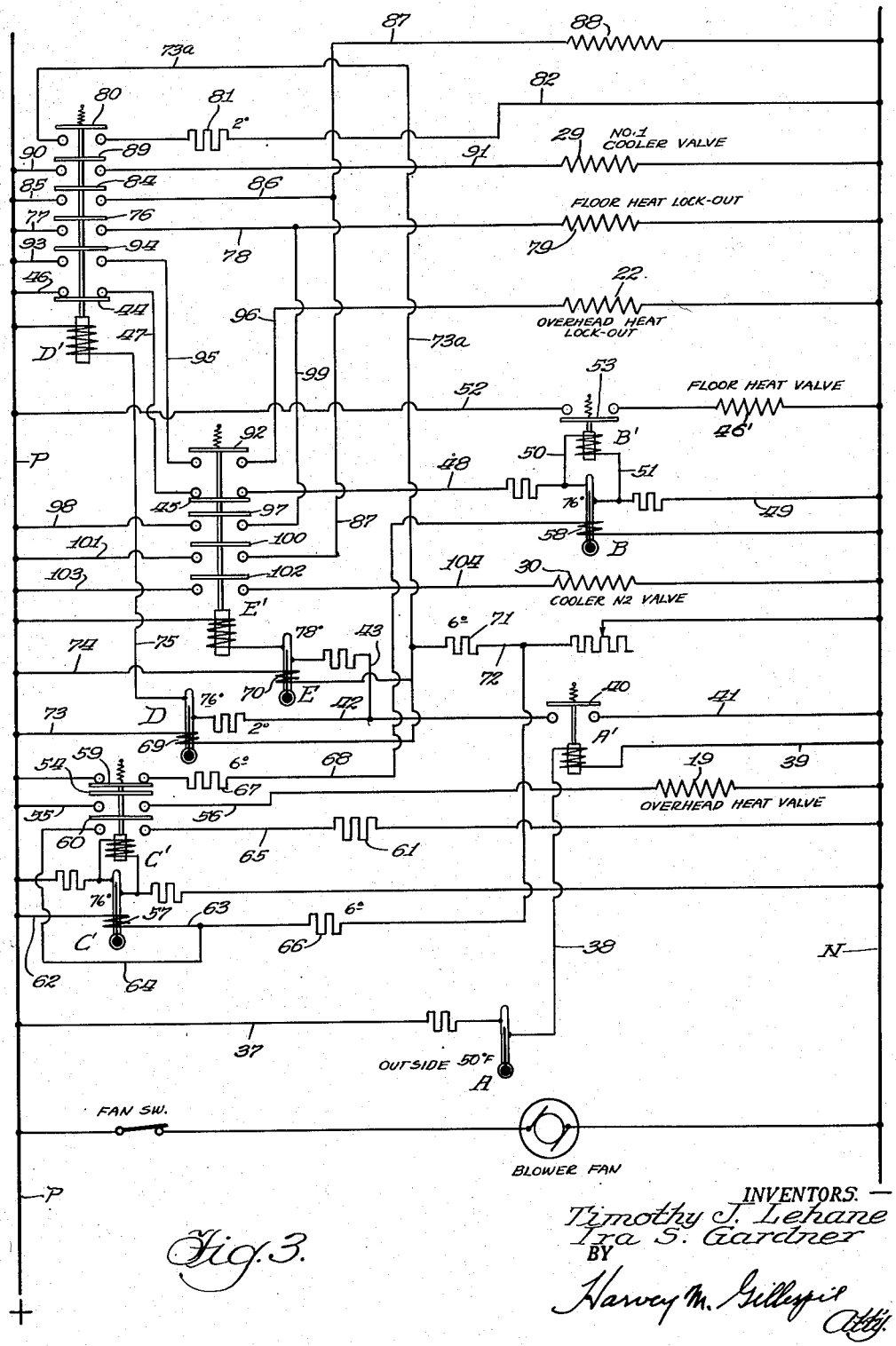
Fig. 3 is a wiring diagram of the electric circuits for controlling the various operating parts of the present heating and cooling system.

The relays A' through E', in the form shown in Fig. 3, move downwardly when energized, and when deenergized are moved upwardly under spring action. Other suitable arrangements, however, may be used as desired.

It is thus seen that the present invention provides an improved heating and cooling system capable of more perfect automatic control and operation for producing a more reliable and satisfactory temperature and condition of the air in an enclosed space.

We claim:

1. Apparatus for heating and cooling the air in a room, comprising, floor heat means having a thermostat and relay, overhead heat means, a first cooler having a thermostat and relay, a second cooler having a thermostat and relay, the latter of which is provided with an energized closed contact and a de-energized closed contact, a compressor, an auxiliary heater for said first cooler thermostat, a refrigerant valve for the first cooler, a first solenoid operated valve for admitting heating medium to the overhead heater, a solenoid operated lock-out valve for preventing the passage of heating medium to said first solenoid operated valve, a floor heat lock-out valve, said first cooler relay when energized having a closed contact for adding heat to said auxiliary heater, another closed contact for opening said refrigerant valve, another closed contact for starting said compressor, another closed contact for locking out the floor heat, and another closed contact connected through said energized closed contact of the second cooler relay for locking out the overhead heat, and said first cooler relay having, when deenergized, a closed contact connected through said de-energized closed contact of the second cooler relay for energizing the floor heat relay when the floor heat thermostat is calling for heat, said last mentioned contact being opened when the cooler relay is energized for deenergizing the floor heat relay.

2. Apparatus as claimed in claim 1, including a solenoid-closed and spring-opened valve for controlling admission of heating medium to the floor heat means, said last mentioned valve being open when the floor heat relay is energized, and closed when the floor heat relay is deenergized.

3. Apparatus for heating and cooling the air in a room, comprising, floor heat means having a thermostat and relay associated therewith, overhead heat means having a thermostat and a relay associated therewith, a first cooler, a second cooler, a thermostat and relay connected with the first cooler, a thermostat and relay connected with the second cooler, separate auxiliary heaters for each of said thermostats, means for constantly supplying an amount of heating electric current to the auxiliary heaters of the said overhead heat thermostat and of both cooler thermostats, means operated by the overhead heat relay for adding a small amount of heat to and subtracting it from the auxiliary heater of the overhead heat thermostat for cycling purposes, and means controlled by the first cooler relay for adding heat to the auxiliary heaters of both cooler thermostats when the said first cooler relay is energized and for subtracting said added heat from the last mentioned auxiliary heaters when the first cooler relay is deenergized.

4. Apparatus for heating and cooling the air in a room, comprising, floor heat means, overhead heat means, a first cooler having a thermostat and a relay, a second cooler having a thermostat and a relay, an auxiliary heater connected with the first cooler thermostat and the first cooler relay, an auxiliary heater connected with the second cooler thermostat and the first cooler relay, means controlled by the first cooler relay for adding heat to both said auxiliary heaters when the first cooler relay is energized, means for admitting heating medium to the floor heat means, means for admitting a heating medium to the overhead heat means, an outside thermostat and a relay therefor having connection with each of said first and second cooler thermostats, contact means associated with the last mentioned relay for preventing effective operation of either of said cooler thermostats, when the outside temperature is below the amount for which the outside thermostat is set, said floor heat means including a relay for controlling application of the floor heat, and means for deenergizing the floor heat relay when the first cooler relay is energized.

TIMOTHY J. LEHANE.
IRA S. GARDNER.

REFERENCES CITED

The following references are of record in the file of this patent:

UNITED STATES PATENTS

| Number | Name | Date |
| --- | --- | --- |
| 2,135,294 | Snediker | Nov. 1, 1938 |
| 2,138,505 | Parks | Nov. 29, 1938 |
| 2,143,356 | Miller et al. | Jan. 10, 1939 |
| 2,234,288 | Smith et al. | Mar. 11, 1941 |
| 2,323,236 | Parks et al. | June 29, 1943 |
| 2,328,472 | Lehane et al. | Aug. 31, 1943 |
| 2,478,588 | Lehane et al. | Aug. 9, 1949 |

FOREIGN PATENTS

| Number | Country | Date |
| --- | --- | --- |
| 142,488 | Switzerland | Dec. 1, 1930 |